United States Patent [19]

Handa et al.

[11] Patent Number: 5,372,879
[45] Date of Patent: Dec. 13, 1994

[54] BIAXIALLY ORIENTED POLYESTER FILM

[75] Inventors: Makoto Handa, Yamato; Tomoyuki Kishino, Tobe, both of Japan

[73] Assignee: Teijin Limited, Osaka, Japan

[21] Appl. No.: 198,578

[22] Filed: Feb. 18, 1994

[30] Foreign Application Priority Data

Feb. 22, 1993 [JP] Japan .................................. 5-31915

[51] Int. Cl.$^5$ .............................................. B32B 5/16
[52] U.S. Cl. ................................. 428/327; 525/176; 525/177; 525/425; 525/443; 525/444; 525/446; 525/437; 528/165; 528/298
[58] Field of Search ................ 428/327; 525/176, 177, 525/425, 437, 444, 446

[56] References Cited

U.S. PATENT DOCUMENTS 5,194,327  3/1993  Takahashi et al. .................. 428/327

*Primary Examiner*—Morton Foelak
*Attorney, Agent, or Firm*—Sherman & Shalloway

[57] ABSTRACT

The present invention provides a biaxially oriented polyester film made of a polyester containing 0.01 to 5% by weight of crosslinked polymer particles characterized by:

(1) having a particle size distribution ratio ($\gamma$) of 1.3 to 3.5,
(2) having an average particle diameter of 0.1 to 2 $\mu$m,
(3) having a non-circularity of 3.4 or more, and
(4) having a standard deviation of noncircularity, of at least 0.16.

The polyester film of the present invention has a flat surface having a small number of large protuberances, excellent running property and excellent winding property, and can be produced economically. The film has excellent properties for use as a base for various magnetic recording media.

15 Claims, 1 Drawing Sheet

BIAXIALLY ORIENTED POLYESTER FILM

BACKGROUND OF THE INVENTION

The present invention relates to a biaxially oriented polyester film. More particularly, the present invention relates to a biaxially oriented polyester film which contains crosslinked polymer particles having a particular particle size distribution ratio, a particular average particle diameter and a particular shape and which has a flat film surface having a small number of large protuberances, excellent running property and excellent winding property.

Biaxially oriented polyester films are in wide use in various applications such as magnetic tape, electric appliances, photographs, metallization, packaging and the like, owing to their excellent properties. Owing particularly to their high strength and elastic modulus, they are in wide use as a base film for a video tape, an audio tape, a computer tape, a floppy disk, etc.

With increasing demands for high-density recording and high quality in these application fields in recent years, a polyester film used as a base film is increasingly required to have flat surface(s) while retaining running property.

In order to improve the running property of a film, inert inorganic particles are added to a polyester to form fine protuberances derived from the particles on the film surface at the time of film formation. Inert inorganic particles usually have a wide particle size distribution and contain coarse particles and must, therefore, be subjected to classification to remove the coarse particles, before the addition to the polyester. This classification, however, incurs increase in production costs, and the cost drastically increases as the classification is made to a higher degree). Moreover, the classification has a limit in narrowing the particle size distribution and it is unable to remove the coarse particles completely.

Hence, researches have been made in recent years on industrial production of particles, particularly crosslinked polymer particles, containing no coarse particles and having uniform particle diameters, and some of such particles are in industrial production. These particles, however, have a relatively large average particle diameter. Production of particles having uniform and smaller particle diameters involves problems to be solved and requires a higher production cost.

The research by the present inventors revealed that in producing a biaxially oriented polyester film of flat surface using the above-mentioned inorganic particles or crosslinked polymer particles, the running property of a film can be increased to a certain degree but the film can not be wound into a film roll in a good form in some cases and that this problem (a film roll in an inferior form) is more serious in using crosslinked polymer particles of uniform particle diameters and is invited by the shifting of film toward left or right in high-speed winding of the film to cause uneven sides of film roll. The reason for the problem is presumed to be that the protuberances on the film surface have relatively uniform heights and this allows air to be trapped between film layers when the film is wound into a film roll. In order to obtain a film roll of good form having even roll sides, it is therefore necessary to minimize the amount of air intake and further to permit easy removal of the trapped air from between film layers.

In order to achieve the easy removal of trapped air from between film layers, it is effective that the protuberances on film surface are allowed to have nonuniform heights by using particles having a relatively wide distribution of particle size. In this respect, the above-mentioned inert inorganic particles are superior to crosslinked polymer particles having uniform particle diameters. The inert inorganic particles, however, contain coarse particles, allowing the protuberances on film surface produced by such coarse particles to have too large heights, and as a result, the flatness of film surface is lost. This brings about reduction in electromagnetic conversion characteristics when the formed film is made into a magnetic tape, or the protuberances produced by the coarse particles cause drop-out. Thus, the increasing demands for high quality polyester film can not be satisfied by use of inert inorganic particles.

The present inventors made an extensive research in order to develop a biaxially oriented polyester film which is free from the drawbacks of conventional inert inorganic particles or crosslinked polymer particles and which has a flat surface having a small number of large protuberances and, in high-speed winding, generates neither wrinkle nor unevenness of film roll sides. As a result, it has been found that such a film can be obtained by allowing a biaxially oriented polyester film to contain an appropriate amount of particles of particular shape obtained by grinding crosslinked polymer particles having a particular particle size distribution ratio and a particular average particle diameter. This finding has led to the present invention.

SUMMARY OF THE INVENTION

The object of the present invention is to produce a biaxially oriented polyester film having (1) a flat surface having a small number of large protuberances and (2) excellent winding property at a high-speed.

According to the present invention, the above object can be achieved by a biaxially oriented polyester film formed of a polyester containing 0.01 to 5% by weight of crosslinked polymer particles characterized by:

(1) having a particle size distribution ratio ($\gamma$) of 1.3 to 3.5,
(2) having an average particle diameter of 0.1 to 2 $\mu$m,
(3) having a non-circularity of 3.4 or more, and
(4) having a standard deviation of non-circularity, of at least 0.16.

DETAILED DESCRIPTION OF THE INVENTION

The biaxially oriented polyester film of the present invention is hereinafter described in detail.

In the present invention, the polyester constituting the film is preferably a polyester containing, as the main recurring unit, an alkylene terephthalate unit or an alkylene naphthalate unit.

Of the above polyester, particularly preferred are polyethylene terephthalate, polyethylene 2,6-naphthalate, and a copolyester formed from a dicarboxylic acid component at least 80 mole % of which is terephthalic acid or 2,6-naphthalenedicarboxylic acid and a glycol component at least 80 mole % of which is ethylene glycol. In the copolyester, the other dicarboxylic acid occupying less than 20 mole % of the total acid components is an aromatic dicarboxylic acid other than terephthalic acid and 2,6-naphthalenedicarboxylic acid; an aliphatic dicarboxylic acid; or an alicyclic dicarboxylic acid. Specific examples of the other dicarboxylic acid are aromatic dicarboxylic acids such as isophthalic acid, biphenyldicarboxylic acid, diphenyl ether dicarboxylic acid, diphenylethanedicarboxylic acid, diphenylsulfonedicarboxylic acid, diphenyl ketone dicarboxylic acid and the like; aliphatic dicarboxylic acids such as adipic acid, sebacic acid and the like; and alicyclic dicarboxylic acids such as cyclohexane-1,4-dicarboxylic acid and the like. The other glycol occupying less than 20 mole % of the total glycol components can be a glycol other than ethylene glycol. Specific examples of the other glycol are aliphatic glycols such as trimethylene glycol, tetramethylene glycol, pentamethylene glycol, hexamethylene glycol, decamethylene glycol and the like; alicyclic glycols such as cyclohexanedimethanol and the like; aromatic diols such as hydroquinone, resorcin, 2,2-bis(4-hydroxyphenyl)propane and the like; aliphatic diols such as 1,4-dihydroxymethylbenzene and the like; and polyalkylene glycols such as polyethylene glycol, polypropylene glycol, polytetramethylene glycol and the like.

The polyester of the present invention includes also a polyester which contains a component derived from an oxycarboxylic acid such as aromatic oxyacid (e.g. hydroxybenzoic acid), aliphatic oxyacid (e.g. ω-hydroxycaproic acid) or the like, in an amount of 20 mole % or less based on the total amount of the dicarboxylic acid components and the oxycarboxylic acid component. The above component derived from oxycarboxylic acid may be a unit of a copolyester or may be bonded to a polyester.

The polyester of the present invention includes also a polyester obtained by copolymerizing a polycarboxylic acid or polyhydroxy compound having at least three functional groups such as trimellitic acid or pentaerythritol in such a amount that the polyester is substantially linear, e.g., 2 mole % or less based on the total amounts of the acid components.

The above polyester is known per se, and can be produced by a process known per se.

The polyester has an intrinsic viscosity of preferably about 0.4 to 0.8, more preferably 0.5 to 0.7, particularly preferably 0.55 to 0.65 as measured at 35° C. in an o-chlorophenol solution.

The crosslinked polymer particles contained in the polyester film of the present invention have a shape characterized by:

(1) having a particle size distribution ratio ($\gamma$) of 1.3 to 3.5, (2) having an average particle diameter of 0.1 to 2 μm, (3) having a non-circularity of 3.4 or more, and (4) having a standard deviation of non-circularity, of at least 0.16.

The crosslinked polymer particles are contained in the polyester in an amount of 0.01 to 5% by weight, preferably 0.01 to 3% by weight, particularly preferably 0.01 to 1% by weight. When the amount is less than 0.01% by weight, the effect by the addition of the crosslinked polymer particles is insufficient while, when the amount is too large, the surface flatness of film is impaired and the number of large protuberances increases owing to the stacking of the polymer particles. Desirably, the polyester contains substantially no coarse particles having particles diameters of 2.5 μm or more.

The above characteristics (1) to (4) are described in detail below.

The particle size distribution ratio ($\gamma$) of the crosslinked polymer particles is a value defined by the following formula.

$$\gamma = D_{25}/D_{75} \qquad (I)$$

wherein $\gamma$ is a particle size distribution ratio; $D_{25}$ is an average particle diameter (μm) when the cumulative weight of particles is 25%; $D_{75}$ is an average particle diameter (μm) when the cumulative weight of particles is 75%; and the weight cumulation is made starting from the particle of largest diameter.

The crosslinked polymer particles contained in the polyester film of the present invention has a particle size distribution ratio ($\gamma$) of 1.3 to 3.5. The value ($\gamma$) implies that the polymer particles have a certain size distribution and are not uniform in size. The particle size distribution ratio ($\gamma$) is preferably 1.4 to 3, more preferably 1.5 to 2.5. When the particle size distribution ratio ($\gamma$) is smaller than the above range, the protuberances on film surface have too uniform heights, allowing the film to have inferior winding property. When the ratio ($\gamma$) is larger than the above range, the number of large protuberances derived by coarse particles undesirably increases.

The crosslinked polymer particles have an average particle diameter of 0.1 to 2 μm, preferably 0.2 to 1.7 μm, more preferably 0.3 to 1.5 μm. When the average particle diameter is too small, the resulting film has insufficient running property and handling properties. When the average particle diameter is too large, the surface flatness of a film is undesirably impaired.

The crosslinked polymer particles of the present invention are obtained by grinding synthesized polymer particles which are relatively uniform, as described later, and are therefore noncircular and relatively nonuniform. Thus, the crosslinked polymer particles are characterized in that their particle size distribution ratio ($\gamma$) and average particle diameter are required to be in the above ranges, and further in that they are required to have the non-circularity and standard deviation thereof in a particular range of values.

That is, the crosslinked polymer particles contained in the present film have a non-circularity of 3.4 or more, preferably 3.5 to 5 (the definition and calculation of the non-circularity are explained later). When the non-circularity is smaller than 3.4, the protuberances formed on the film surface have too uniform heights and shapes, allowing the film to have inferior winding property. When the non-circularity is larger than 5, the film has inferior slipperiness and has an insufficient number of high protuberances on the surface, whereby the winding property of the film tends to be inferior.

The crosslinked polymer particles used in the present invention must have a standard deviation of non-circularity, of at least 0.16. As is clear from the definition given later, the standard deviation of non-circularity indicates the scattering of non-circularities in a large number of particles. Thus, the crosslinked polymer particles used in the present invention have a particular non-circularity having a particular scattering, and the scattering (standard deviation) is at least 0.16, preferably 0.18 to 0.50. When the standard deviation of non-circularity is smaller than 0.16, the grinding of particles is insufficient; consequently, the resulting film has too uniform a surface and inferior winding property, or the coarse particles remaining after grinding form large protuberances on the film surface.

The research by the present inventors revealed that the crosslinked polymer particles having a particular shape can be obtained by grinding crosslinked polymer particles having a certain shape. In the present specification, the particles before grinding are referred to as "crosslinked polymer particles A" or "particles A" in order to distinguish them from the crosslinked polymer particles contained in the polyester film of the present invention.

The crosslinked polymer particles A desirably have an average particle diameter of 0.5 to 5 μm, preferably 0.6 to 4 μm, particularly preferably 0.7 to 3 μm. It is appropriate to conduct the grinding of the particles A so that the average particle diameter after grinding is smaller than that before grinding by 0.1 μm or more. When the particles before grinding have an average particle diameter smaller than 0.5 μm and, after having been ground, are used in a film, it is difficult to form, on the film surface, protuberances having a size enough to impart sufficient running property to the film, which makes it substantially impossible to reduce the amount of air trapped during film winding. On the other hand, when the particles before grinding have an average particle diameter larger than 5 μm, coarse particles not sufficiently ground remain even when said particles are sufficiently ground and, when used in a film, become large protuberances on the film surface.

The crosslinked polymer particles A preferably have a non-circularity of $\pi$ (about 3.14) to 3.3. A non-circularity of $\pi$ implies that particles having such a non-circularity are truly circular in shape. Therefore, particles having a non-circularity of the above range are a circle or close to a circle in cross-sectional shape. In the present invention, the particles A having such a non-circularity are ground to give particles having a non-circularity of 3.4 or more, and the ground particles are added to a polyester to obtain a particles-containing polyester film.

Further, the crosslinked polymer particles A advantageously have a particle size distribution ratio ($\gamma$) of 1.4 or less, preferably 1 to 1.3, particularly preferably 1 to 1.25. Desirably, the particles A are ground so that the particle size distribution ratio after grinding is larger than that before grinding by 0.1 or more. When the particles A have a particle size distribution ratio ($\gamma$) larger than 1.4, the proportion of coarse particles is too large and sufficient grinding of such particles is difficult and, as a result, insufficiently-ground coarse particles remain after grinding and cause large protuberances in a film.

The grinding of the particles A is preferably conducted by the use of a wet grinder such as rod mill, ball mill, vibration rod mill, vibration ball mill, medium agitating mill or the like. A medium agitating mill is particularly suitable and enables short-time grinding of particles. In the grinding, it is preferable to use a dispersing agent such as sodium polyacrylate, sodium pyrophosphate or the like in order to prevent the reagglomeration of particles, because the effects of the present invention are enhanced by the use of such a dispersing agent.

An example of the grinding is described specifically. The particles A as a starting material is mixed with ethylene glycol to obtain a slurry containing 5 to 20% by weight of the particles A. The slurry is fed into a vessel in which 40 to 80%, based on the vessel capacity (volume), of a medium (e.g. glass or ceramic beads of 0.5 to 3 mm in diameter) has been preliminarily charged. A stirrer disk in the vessel is rotated, whereby the medium and the slurry are moved at different speeds and the particles in the slurry are ground by the shear stress caused by said different speeds. The concentration of slurry, the material, amount and particle diameter of medium, and the conditions of stirring (e.g. number of rotations and time) can be optimized experimentally depending upon the polymer kind and size of the particles A and the intended properties of ground particles.

The crosslinked polymer particles of the present invention can consist of any polymer as long as the above-mentioned requirements for particles are met. However, the particles are preferably soft and easily grindable. Silicone resin particles or crosslinked polystyrene particles are particularly preferable. The silicone resin particles and crosslinked polystyrene particles are described in detail below.

The silicone resin particles have a structure represented by the following formula (A):

$$R_xSiO_{2-x/2} \tag{A}$$

wherein R is a hydrocarbon group of 1 to 7 carbon atoms and x is a number of 1 to 1.2.

In the formula (A), R is a hydrocarbon group having 1 to 7 carbon atoms and is preferably an alkyl group of 1 to 7 carbon atoms, a phenyl group or a tolyl group. The alkyl group of 1 to 7 carbon atoms may be a straight chain or a branched chain and includes, for example, methyl, ethyl, n-propyl, isopropyl, n-butyl, isobutyl, tert-butyl, n-pentyl and n-heptyl. Of these groups, methyl and phenyl are preferable as R, and methyl is particularly preferable.

In the above formula (A), x is a number of 1 to 1.2. When x is 1, the formula (A) can be represented by the following formula (A-1):

$$RSiO_{1.5} \tag{A-1}$$

wherein R has the same definition as above.

The structure of the formula (A-1) is derived from the following structural unit of the three-dimensional polymer chain structure of silicone resin.

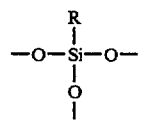

When x is 1.2, the formula (A) can be represented by the following formula (A-2):

$$R_{1.2}SiO_{1.4} \tag{A-2}$$

wherein R has the same definition as above.

The structure of the formula (A-2) can be considered to consist of 0.8 mole of the structure of the formula (A-1) and 0.2 mole of a structure represented by the following formula (A-3):

$$R_2SiO \tag{A-3}$$

wherein R has the same definition as above.

The structure of the formula (A-3) is derived from the following structural unit of the three-dimensional polymer chain structure of silicone resin.

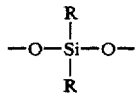

As is appreciated from the foregoing description, the structure of the formula (A) consists substantially of the formula (A-1) structure alone, or consists of a structure wherein the (A-1) structure and the (A-2) structure are bonded randomly at certain proportions.

The silicone resin particles are preferably such that x in the formula (A) is 1 to 1.1.

The crosslinked polystyrene particles can be obtained by dispersion-polymerizing (1) a styrene type monomer such as styrene, methylstyrene, α-methylstyrene, dichlorostyrene or the like, (2) at least one monomer selected from conjugated diene monomers (e.g. butadiene), unsaturated nitrile monomers (e.g. acrylonitrile), methacrylic acid ester monomers (e.g. methyl methacrylate), functional monomers (e.g. unsaturated carboxylic acid), hydroxyl group-containing monomers (e.g. hydroxyethyl methacrylate); epoxide group-containing monomers (e.g. glycidyl methacrylate), unsaturated sulfonic acid monomers, etc. and, as a crosslinking agent for allowing the resulting polymer particles to have a three-dimensional structure, (3) a polyfunctional vinyl compound such as divinylbenzene, ethylene glycol dimethacrylate, trimethylolpropane triacrylate, diallyl phthalate or the like in a solvent such as lower alcohol or the like using a polymethacrylic acid as a dispersion stabilizer, and then removing the polymethacrylic acid adhering onto said surface by centrifugation or dialysis using a semi-transparent membrane, or the like. When the particles have a residual polymethacrylic acid on the surfaces, they are not sufficiently dispersed when added to a polyester and cause agglomeration to form large protuberances on the film surface. The amount of the polymethacrylic acid remaining on the particle surfaces is preferably 5% by weight or less, preferably 3% by weight or less based on the crosslinked polystyrene particles.

The polyester film containing the crosslinked polymer particles having a particular shape, may further contain other particles as long as the object of the present invention is not impaired. The other particles may be any of those ordinarily used as a lubricant in polyester films and may be inorganic or organic particles. The appropriate amount of the other particles used is 0.01 to 1% by weight, preferably 0.02 to 0.5% by weight. The desirable weight ratio of the crosslinked polymer particles and the other particles is 100:0 to 10:90, preferably 100:0 to 20:80, particularly preferably 100:0 to 30:70.

The appropriate average particle diameter of the other particles is 0.01 to 1.0 μm, preferably 0.05 to 0.8 μm.

Specific examples of the other particles are (1) spherical polymer particles (e.g. silicone resin, crosslinked polystyrene, crosslinked acrylic resin, melamine-formaldehyde resin, polyamide resin, polyimide resin, polyamideimide resin and crosslinked polyester), (2) metal oxides (e.g. aluminum oxide, titanium oxide, silicon dioxide, magnesium oxide, zinc oxide and zirconium oxide), (3) metal carbonates (e.g. magnesium carbonate and calcium carbonate), (4) metal sulfates (e.g. calcium sulfate and barium sulfate), (5) carbon (e.g. carbon black, graphite and diamond) and (6) clay minerals (e.g. kaolin, clay and bentonite). Of these, preferable are silicone resin, crosslinked polystyrene, melamine-formaldehyde resin, polyamideimide resin, aluminum oxide, titanium oxide, silicon dioxide, zirconium oxide, calcium carbonate, barium sulfate, diamond and kaolin. Particularly preferable are silicone resin, crosslinked polystyrene, aluminum oxide, titanium oxide, silicon dioxide and calcium carbonate.

The mixing of the polyester with the crosslinked polymer particles or with said particles and the other particles is conducted, for example, by adding the particles to a polymerization system before or during polymerization or by sufficiently kneading the particles and a formed polyester during pelletization or melt extrusion in an extruder.

The polyester containing the crosslinked polymer particles can be made into a biaxially oriented polyester film, for example, by melting said polyester at a temperature ranging from the melting point Tm (°C.) of the polyester to (Tm+70) °C. to obtain an unstretched film having an intrinsic viscosity of 0.35 to 0.9 dl/g, then stretching the unstretched film in a stretch ratio of 2.5 to 5.5 monoaxially (longitudinally or transverse) at a temperature of (Tg−10) °C. to (Tg+70) °C. (Tg is the glass transition temperature of the polyester), and stretching the monoaxially stretched film in a stretch ratio of 2.5 to 5.5 in a direction perpendicular to the direction of the first-stage stretching (the direction of the second-stage stretching is transverse when the direction of the first-stage stretching is longitudinal) at a temperature of Tg (°C.) to (Tg+70) °C. In this case, the desirable area stretch ratio is 9 to 25, preferably 12 to 25. The stretching may be simultaneous biaxial stretching or consecutive biaxial stretching.

The biaxially oriented polyester film can be thermoset at a temperature of (Tg+70) °C. to Tm (°C.). For example, a polyethylene terephthalate film is preferably thermoset at 190° to 230° C. The time of thermosetting is, for example, 1 to 60 seconds.

The biaxially oriented polyester film of the present invention desirably has a plane orientation coefficient of 0.14 or more, preferably 0.16 or more.

Figure 1:
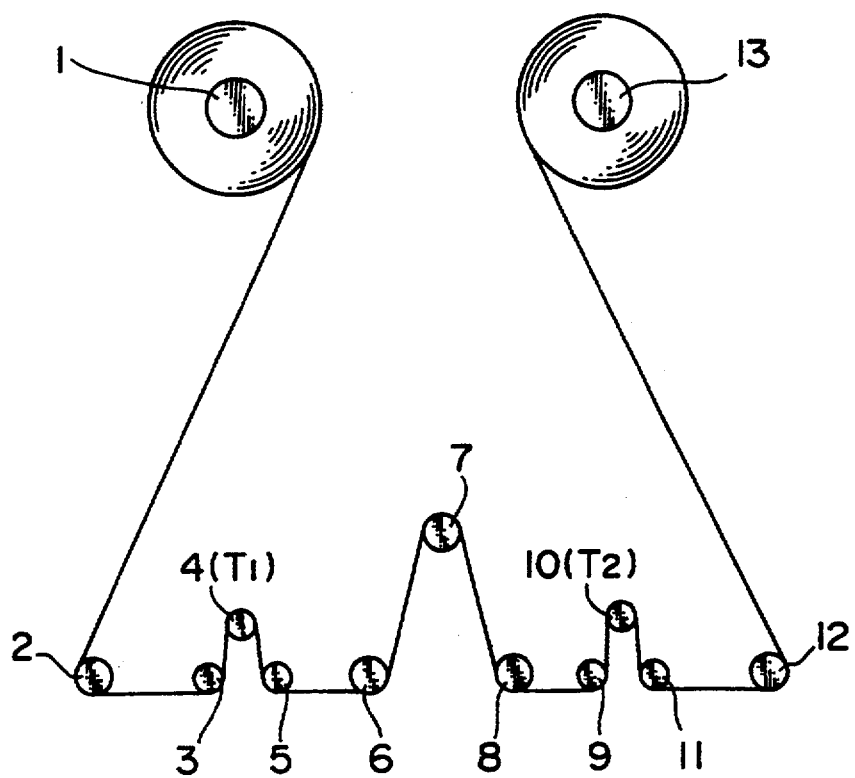
FIG. 1 is a schematic illustration of an apparatus for measuring the running friction coefficient of a film.

In the present invention, various physical properties and characteristics were measured or defined as follows.

(1) Average particle diameter of particles

Particles are measured for diameters using a centrifugal particle size analyzer (Model CP-50 manufactured by Shimadzu Corporation). On the basis of the resultant centrifugal sedimentation curve, there is prepared a cumulative curve between individual particle diameters and amounts of particles having said diameters; in the cumulative curve, a diameter of a particle corresponding to a 50 mass percent of particles is read, and the so-read value is taken as the average particle diameter of the particles (see "Particle Size Measuring Technique (Ryukei Sokutel Gijutsu)" pages. 242–247, 1975, issued by Nikkan Kogyo Press).

(2) Particle size distribution ratio (γ) of particles

Using the centrifugal sedimentation curve of particles, obtained in the measurement of average particle diameter of said particles, there is prepared a cumulative curve between individual particle diameters and amounts of particles of said diameters; from the cumulative curve are read (a) a particle diameter ($D_{25}$) of a particle corresponding to a 25 mass percent of particles when the mass cumulation is made starting from the particle of largest diameter and (b) a particle diameter ($D_{75}$) of a particle corresponding to a 75 mass percent of particles; and a value obtained by dividing $D_{25}$ by $D_{75}$, i.e. $D_{25}/D_{75}$, is taken as the particle size distribution ratio ($\gamma$) of the particles.

(3) Non-circularity of particles

A small strip of a test piece is fixed onto a sample stand of a scanning electron microscope. An ion-etching treatment is applied to the surface of the test piece under the following conditions, using a sputtering apparatus [JFC-1100 ion-etching apparatus manufactured by Nippon Denshi K.K.)]. That is, the test piece is placed in a bell-jar; the atmospheric pressure is reduced to a vacuum of about $10^{-3}$ Torr; and ion-etching is conducted at a voltage of 0.25 kV and an electric current of 12.5 mA for 10 minutes. Then, using the same apparatus, gold is deposited, by sputtering, on the surface of the resulting test piece. Thereafter, the surface is observed using a scanning electron microscope at a magnification of 20.000. In the observation, each of at least 100 particles selected at random is measured for circumferential length (L) and diameter (R) as the diameter of a circle converted from a projected area, using Luzex 500 manufactured by Nihon Regulator Co., Ltd. By applying the L and R to the following formula, the non-circularities of the selected particles are calculated, and the average of said non-circularities is taken as the non-circularity of the particles contained in the film.

Non-circularity=[circumferential length(L)]/[diameter (R) of circle converted from projected area]

(4) Standard deviation of non-circularity

The standard deviation of the non-circularity of at least 100 particles obtained in the above (3) is calculated using the following formula.

$$\text{Standard deviation} = \sqrt{\frac{\sum_{i=1}^{n}(\phi_i - \overline{\phi})}{n}}$$

wherein $\phi_i$ =non-circularities of individual particles,
$\overline{\phi}$ =average of the non-circularities of individual particles, and
n=number of particles (5) Coarse particles in film The same test piece as used in the measurement of non-circularity in the above (3) is subjected to the same pretreatment as in the above (3). A 1-mm$^2$ area of the resulting test piece is observed using a scanning electron microscope at a magnification of 5,000 to 10,000. In the observation, the number of particles each having a length of 2.5 μm or more, present in the 1-mm$^2$ area is counted. Based on this number, the extent of the presence of coarse particles in film is evaluated as follows.

Evaluation

◯: The number of particles each having a length of 2.5 μm or more is 0 (zero).

Δ: The number of particles each having a length of 2.5 μm or more is 1 to 10.

X: The number of particles each having a length of 2.5 μm or more is 11 or larger.

(6) Plane orientation coefficient of film

A film is measured for refractive indexes in three directions at 25° C. at a relative humidity of 65% using Na D line (589 nm) as a light source and ethylene iodide as a mounting liquid. The plane orientation coefficient of the film is calculated from the refractive indexes, using the following formula.

Plane orientation coefficient=$[(n_{MD}+n_{TD})/2]-n_Z$ wherein $n_{MD}$ =refractive index of film in longitudinal direction,
$n_{TD}$ =refractive index of film in transverse direction, and
$n_Z$ =refractive index of film in thickness direction.

(7) Surface roughness (Ra) of film

A film is measured for centerline average roughness (Ra) according to JIS B 0601 by means of a needle-contact type surface roughness tester (Surfcorder SE-30C supplied by Kosaka Laboratory Ltd.). The measurement conditions are as follows.

(a) Radius of contact needle top: 2 μm
(b) Measurement pressure: 30 mg
(c) Cut-off: 0.08 mm
(d) Measurement length: 1.0 mm
(e) Reporting of measurement data: One sample is measured five times. The largest measurement value is excluded, and Ra is expressed in terms of the average of the remaining four measurement values. The average is indicated down to four places of decimals by, at the fifth decimal place, counting fractions of 5 and over as a unit and disregarding the rest.

(8) Non-defective ratio of film when wound into rolls

The non-defective ratio of film when wound into rolls is indicated as the percentage of non-defective film rolls when a film of 500 mm in width and 4,000 m in length is wound into 100 rolls. In this case, "non-defective film roll" refers to a film roll having neither wrinkle nor small protuberance and being uniform at the sides.

(9) Number of large protuberances on film surface

Two films are tightly adhered to each other; then, a Na monochromatic light is applied thereto; a 100-cm$^2$ area of the adhered film surface is observed using a stereomicroscope; the number of protuberances of two rings (0.58 μm) or more appearing correspondingly to the heights of protuberances is counted and taken as "number of large protuberances" present on the film surface.

(10) Intrinsic viscosity [η]

Is a value measured at 35° C. using o-chlorophenol as a solvent. The unit is 100 cc/g.

(11) Running friction coefficient of film

A film is measured for running friction coefficient, using an apparatus shown in FIG. 1, in the following manner.

In FIG. 1, numeral 1 indicates a supply reel; numeral 2 indicates a tension controller; numerals 3, 5, 6, 8, 9 and 11 indicate free rollers; numeral 4 indicates a tension detector (inlet); numeral 7 indicates a fixed pin made of stainless steel SUS 304 (outer diameter=5 mmφ, surface roughness Ra=20 nm); numeral 10 indicates a tension detector (outlet); numeral 12 indicates a guide roller; and numeral 13 indicates a wind-up reel.

Under an environment having a temperature of 20° C. and a humidity of 60%, a film is allowed to run (frictionally) at a rate of 200 cm/minute in contact with the fixed pin 7 at an angle $\theta=(152/180)\pi$ radian (152°). When a tension T$_1$ at the inlet is adjusted to 35 g with the tension controller 2 and the film runs 90 m, a tension $T_2$ (g) at the outlet is detected with the outlet tension detector, and the running friction coefficient $\mu k$ of the film is calculated using the following formula.

$$\mu k = (2.303/\theta)\log(T_2/T_1) = 0.868\log(T_2/35)$$

The present invention is hereinafter described in more detail with reference to Examples. In the Examples, parts refer to parts by weight.

EXAMPLE 1

There were used, as the crosslinked polymer particles A, silicone resin fine particles having an average particle diameter of 1.4 μm, a particle size distribution ratio (γ) of 1.1 and a non-circularity of 3.2. 100 parts of the fine particles were mixed with 5 parts of sodium pyrophosphate and 895 parts of ethylene glycol. They were mixed and dispersed for 5 minutes using a desktop mixer (MX-M3 manufactured by Matsushita Electric Industrial Co., Ltd.) to obtain a slurry. Then, the slurry was subjected to a wet-grinding treatment using a sand grinder (SGL-¼ G manufactured by Igarashi Kikai), under the following conditions.

Medium: glass beads of 0.8 mm in diameter
Medium amount: 500 ml
Slurry volume: 500 ml
Rotation: 1,800 rpm
Treating time: 2 hours The particles in the slurries after wet-grinding treatment had an average particle diameter of 0.8 μm, a particle size distribution ratio (γ) of 1.5, a non-circularity of 3.5 and a standard deviation of non-circularity of 0.19.

Then, 100 parts of dimethyl terephthalate, 60 parts of ethylene glycol and manganese acetate as an ester interchange catalyst were subjected to an ester interchange reaction. Just before the completion of the reaction, 5 parts of the above-obtained slurry after wet-grinding treatment was added to the reaction mixture.

There were further added antimony trioxide as a polymerization catalyst and phosphorous acid as a stabilizer, and the mixture was subjected to polymerization in a conventional manner to obtain a polyethylene terephthalate having an intrinsic viscosity of 0.62 (this polyethylene terephthalate is hereinafter referred to as material A). The polymer contained 0.5% by weight of fine particles.

There was also polymerized a polyethylene terephthalate containing substantially no fine particles by a conventional method. The polymer was made into pellets.

The material A was mixed with the polyethylene terephthalate pellets containing substantially no fine particles, whereby the material A was diluted so as to have a particle concentration shown in Table 1. The resulting material was dried at 170° C. for 3 hours, then fed into an extruder hopper and melted at 280° to 300° C. The molten polymer was subjected to extrusion through a 1-mm slit die to obtain a 200-μm unstretched film on a rotating cooling drum having a surface Finish of about 0.3 s and a surface temperature of 20°C.

The unstretched film was preheated at 75° C. and heated, between a low-speed roll and a high-speed roll, using an IR heater having a surface temperature of 900°C., provided 15 mm above the film, to stretch the film 3.6 times longitudinally. The film was then rapidly cooled and fed into a stenter to stretch the film at 105° C. 3.7 times transversely. The resulting biaxially oriented film was thermoset at 205° C. for 5 seconds to obtain a thermoset biaxially oriented polyethylene terephthalate film having a thickness of 15 μm.

The properties of the film are shown in Table 1.

The film had a flat surface (surface roughness Ra=0.022 μm), a high non-defective ratio of 98% when wound into rolls, and a very small number (one) of large protuberances.

Thus, a film having a flat surface, excellent winding property and a small number of large protuberances can be obtained by allowing the film to contain a particular amount of fine particles having a particular average particle diameter, a particular particle size distribution ratio, a particular non-circularity and a particular standard deviation of non-circularity.

EXAMPLES 2 and 3

The procedure of Example 1 was repeated except that the particles A used in Example 1 were replaced by particles shown in Table 1, whereby polyethylene terephthalate films were obtained.

These films had a flat surface, excellent winding property and a small number of large protuberances.

EXAMPLES 4 to 7

The procedure of Example 1 was repeated except that the particles A used in Example 1 were replaced by particles shown in Table 1 and, as other particles, there were used particles also shown in Table 1, whereby polyethylene terephthalate films were obtained.

These films also satisfied all of the flat surface, high non-defective ratio when wound into rolls, and small number of large protuberances. It is appreciated that the presence of other particles in addition to the fine particles obtained by grinding particles A does not impair the effects of the present invention.

EXAMPLES 8 and 9

The procedure of Example 1 was repeated except that the dimethyl terephthalate used in Example 1 was replaced by the same moles of dimethyl 2,6-naphthalate and there were used particles A and other particles shown in Table 1, whereby pellets of polyethylene 2,6-naphthalate were obtained.

The polyethylene 2,6-naphthalate pellets were dried at 170° C. for 5 hours and then subjected to melt extrusion at 300° C. Each extrudate was rapidly cooled and solidified on a casting drum kept at 60° C. to obtain 200-μm unstretched films.

The unstretched films were preheated at 120° C., and heated, between a low-speed roll and a high-speed roll, using an IR heater having a surface temperature of 950° C., provided 15 mm above the film, to stretch the film 3.6 times longitudinally. Each of the films was then rapidly cooled and fed into a stenter to stretch the film at 125° C. 3.7 times transversely. Each of the resulting biaxially oriented films was thermoset at 215° C. for 10 seconds to obtain thermoset biaxially oriented polyethylene 2,6-naphthalate films having a thickness of 15 μm.

The properties of the films are shown in Table 1. The films according to the present invention, even when using different polyesters, had a flat surface, excellent winding property and a small number of large protuberances.

TABLE 1

| | | | | Example 1 PET | Example 2 PET | Example 3 PET |
|---|---|---|---|---|---|---|
| Kind of polyester | | | | | | |
| Properties of particles added | Inert particles A | Before grinding | Kind of particles | Fine particles of silicone resin | Fine particles of silicone resin | Fine particles of crosslinked polystyrene resin |
| | | | Average particle diameter (μm) | 1.4 | 2.3 | 1.8 |
| | | | Particle size distribution ratio | 1.1 | 1.2 | 1.1 |
| | | | Non-circularity | 3.2 | 3.2 | 3.2 |
| | | After grinding | Average particle diameter (μm) | 0.8 | 1.2 | 0.5 |
| | | | Particle size distribution ratio | 1.5 | 1.6 | 1.6 |
| | | | Non-circularity | 3.5 | 3.6 | 3.5 |
| | | | Standard deviation of non-circularity | 0.19 | 0.22 | 0.19 |
| | | | Coarse particles | ○ | ○ | ○ |
| | | | Amount added (wt. %) | 0.1 | 0.03 | 0.15 |
| | Particles C | | Kind of particles | — | — | — |
| | | | Average particle diameter (μm) | — | — | — |
| | | | Amount added (wt. %) | — | — | — |
| | Properties of film | | Surface roughness Ra (μm) | 0.022 | 0.011 | 0.022 |
| | | | Running friction coefficient | 0.18 | 0.23 | 0.23 |
| | | | Non-defective ratio of film roll (%) | 97 | 98 | 95 |
| | | | Plane orientation coefficient | 0.170 | 0.170 | 0.170 |
| | | | Number of large protuberances (number/100 cm$^2$) | 1 | 2 | 1 |

| | | | | Example 4 PET | Example 5 PET | Example 6 PET |
|---|---|---|---|---|---|---|
| Kind of polyester | | | | | | |
| Properties of particles added | Inert particles A | Before grinding | Kind of particles | Fine particles of silicone resin | Fine particles of silicone resin | Fine particles of silicone resin |
| | | | Average particle diameter (μm) | 1.4 | 0.7 | 2.5 |
| | | | Particle size distribution ratio | 1.1 | 1.1 | 1.2 |
| | | | Non-circularity | 3.2 | 3.2 | 3.2 |
| | | After grinding | Average particle diameter (μm) | 0.4 | 0.3 | 1.0 |
| | | | Particle size distribution ratio | 2.3 | 2.2 | 1.5 |
| | | | Non-circularity | 4.0 | 3.6 | 3.9 |
| | | | Standard deviation of non-circularity | 0.21 | 0.25 | 0.21 |
| | | | Coarse particles | ○ | ○ | ○ |
| | | | Amount added (wt. %) | 0.2 | 0.5 | 0.08 |
| | Particles C | | Kind of particles | Aluminum oxide | Silicon oxide | Titanium oxide |
| | | | Average particle diameter (μm) | 0.13 | 0.17 | 0.30 |
| | | | Amount added (wt. %) | 0.20 | 0.25 | 0.30 |
| | Properties of film | | Surface roughness Ra (μm) | 0.018 | 0.019 | 0.020 |
| | | | Running friction coefficient | 0.22 | 0.23 | 0.17 |
| | | | Non-defective ratio of film roll (%) | 97 | 95 | 95 |
| | | | Plane orientation coefficient | 0.170 | 0.170 | 0.170 |
| | | | Number of large protuberances (number/100 cm$^2$) | 0 | 0 | 1 |

| | | | | Example 7 PET | Example 8 PEN | Example 9 PEN |
|---|---|---|---|---|---|---|
| Kind of polyester | | | | | | |
| Properties of particles added | Inert particles A | Before grinding | Kind of particles | Fine particles of crosslinked polystyrene resin | Fine particles of silicone resin | Fine particles of silicone resin |
| | | | Average particle diameter (μm) | 2.0 | 1.6 | 1.2 |
| | | | Particle size distribution ratio | 1.1 | 1.1 | 1.1 |
| | | | Non-circularity | 3.2 | 3.2 | 3.2 |
| | | After grinding | Average particle diameter (μm) | 0.7 | 0.5 | 0.7 |
| | | | Particle size distribution ratio | 1.7 | 1.8 | 1.5 |
| | | | Non-circularity | 3.6 | 4.1 | 3.5 |
| | | | Standard deviation of non-circularity | 0.19 | 0.23 | 0.19 |
| | | | Coarse particles | ○ | ○ | ○ |
| | | | Amount added (wt. %) | 0.08 | 0.2 | 0.1 |
| | Particles C | | Kind of particles | Aluminum oxide | — | Aluminum oxide |
| | | | Average particle diameter (μm) | 0.13 | — | 0.13 |
| | | | Amount added (wt. %) | 0.20 | — | 0.20 |
| | Properties of film | | Surface roughness Ra (μm) | 0.017 | 0.020 | 0.021 |
| | | | Running friction coefficient | 0.19 | 0.20 | 0.20 |
| | | | Non-defective ratio of film roll (%) | 95 | 97 | 97 |
| | | | Plane orientation coefficient | 0.170 | 0.264 | 0.264 |
| | | | Number of large protuberances | 1 | 0 | 1 |

TABLE 1-continued (number/100 cm²)

Comparative Example 1

The procedure of Example 1 was repeated except that there were used, as the crosslinked polymer particles A, silicone resin particles having an average particle diameter of 0.8 μm, a particle size distribution ratio (γ) of 1.1 and a non-circularity of 3.2 and that said particles were used without being ground, whereby a biaxially oriented polyethylene terephthalate film was obtained.

The properties of the film are shown in Table 2. The particles used in this Comparative Example had the same average particle diameter as the fine particles used in Example 1, obtained by grinding particles A, but had a sharp particle size distribution and were used without being ground. Therefore, the film using the particles had too uniform protuberances on the surface and had inferior winding property.

Comparative Example 2

The procedure of Example 1 was repeated except that there were used, as the particles A, crosslinked polystyrene particles having an average particle diameter of 0.8 μm, a particle size distribution ratio (γ) of 1.2 and a non-circularity of 3.2, whereby a biaxially oriented polyethylene terephthalate film was obtained.

The film had inferior winding property similarly to the film of Comparative Example 1.

Comparative Example 3

The procedure of Example 1 was repeated except that tile particles A were replaced by calcium carbonate having an average particle diameter of 0.8 μm, a particle size distribution ratio (γ) of 2.8 and a non-circularity of 3.7 and that the calcium carbonate was used without being ground, whereby a polyethylene terephthalate film was obtained.

The film had superior winding property but contained a large amount of coarse particles and had, on the surface, a large number of large protuberances derived from the coarse particles.

Comparative Examples 4 to 8

The procedure of Example 1 was repeated except that particles shown in Table 2 were used as the particles A and other particles, whereby polyethylene terephthalate films were obtained.

In Comparative Example 4, since the particles A had too large an average particle diameter before grinding, a large amount of unground coarse particles remained even after grinding, resulting in the presence of a very large number of large protuberances on the film surface.

In Comparative Example 5, since the particles A had too small an average particle diameter before and after grinding, the protuberances on the film surface had no sufficient heights and the film had inferior winding property.

In Comparative Example 6, since the grinding was insufficient, the protuberances on the film surface had relatively uniform heights and the film had inferior winding property.

In Comparative Example 7, since the amount of the ground particles A added was too small, the film had inferior running property and it was impossible to wind the film into good film rolls.

In Comparative Example 8, since calcium carbonate particles containing a large amount of coarse particles were used after having being ground, the film had a very large number of large protuberances on the surface.

TABLE 2

| Kind of polyester | | | | Comparative Example 1 PET | Comparative Example 2 PET | Comparative Example 3 PET |
|---|---|---|---|---|---|---|
| Properties of particles added | Inert particles A | Before grinding | Kind of particles | Fine particles of silicone resin | Fine particles of crosslinked polystyrene resin | Calcium carbonate |
| | | | Average particle diameter (μm) | 0.8 | 0.8 | 0.8 |
| | | | Particle size distribution ratio | 1.1 | 1.2 | 2.8 |
| | | | Non-circularity | 3.2 | 3.2 | 3.7 |
| | | After grinding | Average particle diameter (μm) | No grinding | No grinding | No grinding |
| | | | Particle size distribution ratio | | | |
| | | | Non-circularity | | | |
| | | | Standard deviation of non-circularity | 0.03 | 0.02 | 0.16 |
| | | | Coarse particles | ○ | ○ | Δ |
| | | | Amount added (wt. %) | 0.1 | 0.1 | 0.3 |
| | Particles C | | Kind of particles | | | |
| | | | Average particle diameter (μm) | | | |
| | | | Amount added (wt. %) | | | |
| Properties of film | | | Surface roughness Ra (μm) | 0.021 | 0.020 | 0.019 |
| | | | Running friction coefficient | 0.18 | 0.20 | 0.22 |
| | | | Non-defective ratio of film roll (%) | 35 | 21 | 96 |
| | | | Plane orientation coefficient | 0.170 | 0.170 | 0.170 |
| | | | Number of large protuberances (number/100 cm²) | 0 | 1 | 67 |

| Kind of polyester | | | | Comparative Example 4 PET | Comparative Example 5 PET | Comparative Example 6 PET |
|---|---|---|---|---|---|---|
| Properties of | Inert | Before | Kind of particles | Fine particles of | Fine particles of | Fine particles of |

TABLE 2-continued

| particles added | particles A | grinding | | crosslinked poly-styrene resin | silicone resin | silicone resin |
|---|---|---|---|---|---|---|
| | | | Average particle diameter (μm) | 10.0 | 0.6 | 1.4 |
| | | | Particle size distribution ratio | 1.1 | 1.2 | 1.1 |
| | | | Non-circularity | 3.2 | 3.2 | 3.2 |
| | | After grinding | Average particle diameter (μm) | 0.8 | 0.05 | 1.2 |
| | | | Particle size distribution ratio | 4.5 | 3.4 | 1.2 |
| | | | Non-circularity | 3.9 | 5.2 | 3.3 |
| | | | Standard deviation of non-circularity | 0.22 | 0.33 | 0.08 |
| | | | Coarse particles | X | ◯ | ◯ |
| | | | Amount added (wt. %) | 0.08 | 0.5 | 0.05 |
| | Particles C | | Kind of particles | | | |
| | | | Average particle diameter (μm) | | | |
| | | | Amount added (wt. %) | | | |
| Properties of film | | | Surface roughness Ra (μm) | 0.020 | 0.009 | 0.020 |
| | | | Running friction coefficient | 0.19 | 0.42 | 0.21 |
| | | | Non-defective ratio of film roll (%) | 97 | 2 | 38 |
| | | | Plane orientation coefficient | 0.170 | 0.170 | 0.170 |
| | | | Number of large protuberances (number/100 cm²) | 120 | 0 | 1 |

| | | | Kind of polyester | Comparative Example 7 PET | Comparative Example 8 PET |
|---|---|---|---|---|---|
| Properties of particles added | Inert particles A | Before grinding | Kind of particles | Fine particles of silicone resin | Calcium carbonate |
| | | | Average particle diameter (μm) | 1.4 | 1.2 |
| | | | Particle size distribution ratio | 1.1 | 2.9 |
| | | | Non-circularity | 3.2 | 3.8 |
| | | After grinding | Average particle diameter (μm) | 0.8 | 0.8 |
| | | | Particle size distribution ratio | 1.5 | 3.4 |
| | | | Non-circularity | 3.5 | 4.7 |
| | | | Standard deviation of non-circularity | 0.19 | 0.22 |
| | | | Coarse particles | ◯ | X |
| | | | Amount added (wt. %) | 0.001 | 0.3 |
| | Particles C | | Kind of particles | | |
| | | | Average particle diameter (μm) | | |
| | | | Amount added (wt. %) | | |
| Properties of film | | | Surface roughness Ra (μm) | 0.004 | 0.020 |
| | | | Running friction coefficient | Running was impossible | 0.21 |
| | | | Non-defective ratio of film roll (%) | 0 | 98 |
| | | | Plane orientation coefficient | 0.170 | 0.170 |
| | | | Number of large protuberances (number/100 cm²) | 0 | 89 |

According to the present invention, a biaxially oriented polyester film having (1) a flat surface having a small number of large protuberances and (2) excellent high-speed winding property can be provided in a lower cost by allowing the film to contain crosslinked polymer particles having a particular particle size distribution ratio, a particular average particle diameter, a particular non-circularity and a particular standard deviation of non-circularity. The film has excellent properties for use as a base film for magnetic recording media.

We claim:

1. A biaxially oriented polyester film formed of a polyester containing 0.01 to 5% by weight of crosslinked polymer particles characterized by:
   (1) having a particle size distribution ratio ($\gamma$) of 1.3 to 3.5,
   (2) having an average particle diameter of 0.1 to 2 μm,
   (3) having a non-circularity of 3.4 or more, and
   (4) having a standard deviation of non-circularity, of at least 0.16.

2. The polyester film set forth in claim 1, wherein the crosslinked polymer particles contain substantially no coarse particles having particles diameters of 2.5 μm or more.

3. The polyester film set forth in claim 1, wherein the crosslinked polymer particles have a particle size distribution ratio ($\gamma$) of 1.4 to 3.

4. The polyester film set forth in claim 1, wherein the crosslinked polymer particles have an average particle diameter of 0.2 to 1.7.

5. The polyester film set forth in claim 1, wherein the crosslinked polymer particles have a non-circularity of 3.5 to 5.

6. The polyester film set forth in claim 1, wherein the crosslinked polymer particles have a standard deviation of non-circularity, of 0.18 to 0.3.

7. The polyester film set forth in claim 1, wherein the crosslinked polymer particles are silicone resin particles.

8. The polyester film set forth in claim 1, wherein the crosslinked polymer particles are crosslinked polystyrene resin particles.

9. The polyester film set forth in claim 1, wherein the crosslinked polymer particles are obtained by grinding.

10. The polyester film set forth in claim 9, wherein the crosslinked polymer particles are obtained by grinding crosslinked polymer particles having an average particle diameter of 0.5 to 5 μm so that the average particle diameter after grinding is smaller than that before grinding by 0.1 μm or more.

11. The polyester film set forth in claim 9, wherein the crosslinked polymer particles are obtained by grinding crosslinked polymer particles having a non-circularity of π to 3.3.

12. The polyester film set forth in claim 1, wherein the polyester further contains 0.01 to 1% by weight of inorganic or organic particles having an average particle diameter of 0.01 to 1.0 μm.

13. The polyester film set forth in claim 1, having a plane orientation coefficient of 0.14 or more.

14. The polyester film set forth in claim 1, wherein the polyester has an ethylene terephthalate unit as a main recurring unit:.

15. The polyester film set forth in claim 1, wherein the polyester has an ethylene 2,6-naphthalenedicarboxylate unit as a main recurring unit.

* * * * *